United States Patent [19]

Schneider et al.

[11] 3,836,758

[45] Sept. 17, 1974

[54] WIDE FREQUENCY RANGE COUNTER SYSTEM UTILIZING AUTOMATIC RANGE SEARCHING AND LOOP COMPENSATION

[75] Inventors: Richard F. Schneider, Sunnyvale; Arthur R. Bloedorn, Los Altos, both of Calif.

[73] Assignee: Hewlett-Packard Company, Palo Alto, Calif.

[22] Filed: Nov. 1, 1972

[21] Appl. No.: 302,776

[52] U.S. Cl. ...... 235/151.31, 235/92 FQ, 324/78 D

[51] Int. Cl. .......... G01r 23/02

[58] Field of Search .......... 235/92 FQ, 151.31; 324/78 R, 78 D, 81, 82

[56] References Cited

OTHER PUBLICATIONS

Allen, R. L. Frequency Divider Extends Automatic Digital Frequency Measurements to 12.4 GHz, In Hewlett-Packard Journal, (18) 8: pp. 2–7 April 1967.

*Primary Examiner*—Charles E. Atkinson
*Assistant Examiner*—R. Stephen Dildine, Jr.
*Attorney, Agent, or Firm*—Patrick J. Barrett

[57] ABSTRACT

A microwave frequency counter operable over the frequency range of from 1 Hz to 18 GHz is provided employing an input phase lock loop and automatic transfer oscillator techniques for determining the harmonic number at which the input phase lock loop locks, means being provided for automatically searching over a plurality of N number ranges in succession, with means for changing the loop compensation of the input phase lock loop for different N ranges and also changing the VCO sweep voltage rates for the various N ranges to insure phase loop lock on the preferred N number.

8 Claims, 11 Drawing Figures

WIDE FREQUENCY RANGE COUNTER SYSTEM UTILIZING AUTOMATIC RANGE SEARCHING AND LOOP COMPENSATION

BACKGROUND OF THE INVENTION

In phase lock loop systems, where the output frequency of a VCO is tuned in response to the error signal output of a loop phase detector to lock the VCO to the frequency of an incoming frequency signal to be measured, proper loop compensation in the form of a lag network is needed to obtain a stable loop. This compensation serves to roll off the gain of the loop such that, for instance when the phase shift through the loop passes through 120°, the amplifier gain passes through zero. In phase lock loop systems intended to operate over very large input frequency ranges, for example, from 300 MHz to 12 GHz, harmonic mixers are utilized such that the loop locks on a harmonic N of the operating frequency of the VCO. However, the loop gain of such harmonic systems varies in direct proportion to the harmonic N, and, if the gain is optimum for one N number, it is not optimum for the other harmonics.

In certain prior art systems, the compensation is selected to roll off the gain of the loop for the highest harmonic number, resulting in slower acquisition times for the lower incoming frequencies and reduced loop bandwidth with the lower N numbers. This increases the time of operation to search across the full range of possible signal input frequencies for lock and limits the input frequency FM tolerance. In other systems, special forms of compensation is used, for example, a 9dB type of compensation where the cross-over is brought through with a 9dB slope over the dynamic range of the gain of the input. This maintains the desirable damping factor for the large variation in gain but sacrifices bandwidth and FM capability.

In another form of wide range phase lock loop system used in a spectrum analyzer operating from 300 MHz to 12 GHz, a front panel switch permits manual selection of octave range steps accompanied by the simultaneous selection of a correct lag network for optimum loop compensation in each of the ranges. However, although bandwidth and FM capability are improved, the search process is time consuming.

SUMMARY OF THE PRESENT INVENTION

The present invention provides a frequency counter utilizing phase lock loop techniques which operates automatically and rapidly to search for and phase lock on the incoming frequency $F_x$ over a wide range of incoming frequencies, e.g., 250 MHz to 18 GHz, providing a broad bandwidth characteristic and maximum FM tolerance. In a preferred embodiment, as an added feature a direct count branch is employed to read lower frequencies, from 1 Hz to 250 MHz without employing the phase lock loop circuitry.

The frequency counter is programmed so as to first test for the direct count low frequency and, if not encountered, to search for phase lock in a plurality of separate successive frequency ranges or steps dictated by different harmonic numbers, e.g., one step covering harmonic numbers N = 4–8, with another step covering N = 8–16, etc. On each step, the proper lag network for correct loop compensation for the selected N numbers is automatically selected and inserted into the loop. In addition, the proper amplitude of the ramp signal to the VCO is selected to give the desired frequency range sweep for the N numbers in the selected frequency search range.

The programmer will step the phase lock loop circuit through each search range in order and, in the preferred embodiment, in order from the highest frequency range to the lowest frequency range. If lock is acquired by the input phase lock loop in one of these ranges, the VCO sweep stops, and the harmonic N at which the phase lock loop locked is automatically determined by use of an automatic transfer oscillator. This computed N number is automatically checked with the particular program step existing at lock, and if this computed N is one of the permissible N numbers in that particular step, the system then operates with this N number to compute the incoming frequency $F_x$ and display this frequency. Since only $N \geq 2$ are desired in the operation of this counting system, a test is made automatically to determine that the condition $N = 1$ is not present, otherwise the loop will be unlocked and the search resumed.

If the N number checked at lock is not a permissible number within the N number range in the particular program step, indicating premature or late lock, then the phase lock is broken and the system commences to search again in the successive step-by-step N range manner until correct lock is reached.

DESCRIPTION OF THE PREFERRED EMBODIMENTS

Figure 1:
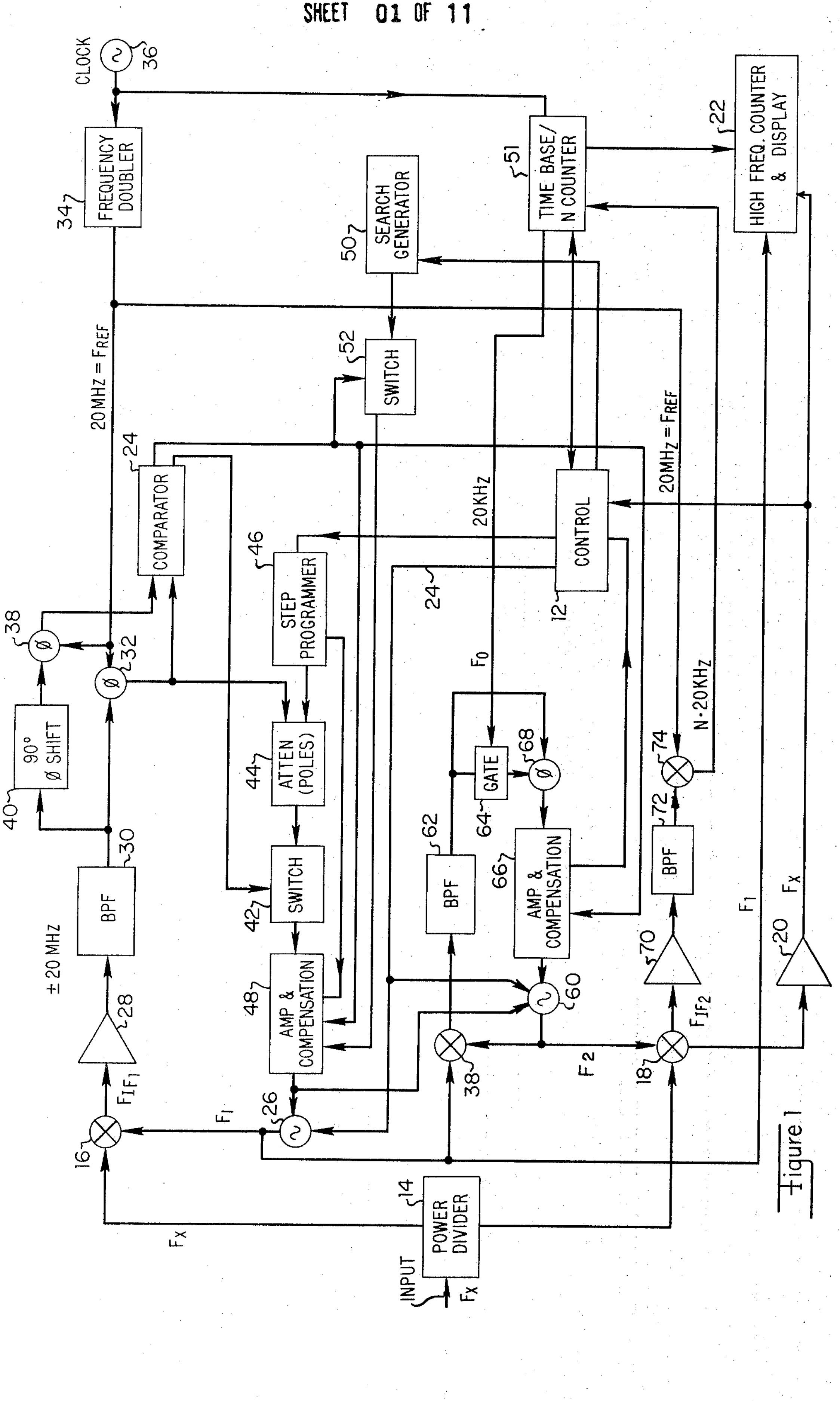
FIG. 1 is a block diagram of the novel counter of the present invention.

Referring now to FIG. 1 there is shown a block diagram of a programmed frequency counter of the present invention including a program control circuit 12 of conventional design including a ROM, a test selecter responsive to qualifiers such as N check, $N \geq 2$, direct count, etc. and an action decoder for providing action signals such as search, register count, set, reset, etc. operating in accordance with the program flow chart described below to step this frequency counter through the various action and test stages.

The unknown incoming frequency signal $F_x$ is divided by a power divider 14 into two paths, one leading to the harmonic sampler 16 of the input phase lock loop and the other path leading to the harmonic sampler 18 in the harmonic number determination section of the system.

The preferred embodiment of this counter is designed to count an incoming frequency $F_x$ as low as 10 Hz so that, for $F_x$ of 10 Hz to 250 MHz, a direct counting path is provided via the inactive sampler 18 and direct count amplifier 20 to the output counter and display stage 22, bypassing the phase lock loop circuitry.

As a first step, the program control circuit 12 disables the phase lock loop circuits via the inhibit line 24 while the direct count circuitry searches the low frequency range during this direct count period. If such a low frequency signal is present, the count is displayed and the phase lock loops remain inactive.

If the incoming signal is not detected in this low frequency range within a suitable delay period, the programmer steps to the next stage of operation where the phase lock loops are activated and the input phase lock loop commences the multi-step search through the various separate ranges for the frequency $F_x$. In this preferred embodiment, there are six search steps covering the following N numbers and input frequencies $F_x$:

| Step No. | $F_x$ | N |
|---|---|---|
| 1 | 8–18 GHz | 64–256 |
| 2 | 4–8 GHz | 32–64 |
| 3 | 2–4 GHz | 16–32 |
| 4 | 1–2 GHz | 8–16 |
| 5 | .5–1 GHz | 4–8 |
| 6 | .25–.5 GHz | 2–4 |

The second input to the sampler 16 is $F_1$ provided from the input loop VCO 26 which operates between 120 and 180 MHz. This frequency $F_1$ is provided to the sampler via a standard form of sampler driver in the form of very short pulses such that, in the frequency domain, all of the harmonics N of $F_1$ are present in the sampler 16 and $N_{MAX}F_1$ exceeds the highest frequency of $F_x$. The output of the sampler 16, $F_{IF\ 1}$, is transmitted through a preamplifier, and limiter/amplifier 28, and band pass filter 30 (20 MHz ± 7 MHz) to a phase detector circuit 32 which receives a second input $F_{REF}$ (20 MHz) from a frequency doubler 34 fed from a 10 MHz source 36. This phase detector 32 provides a dc output proportional to the phase angle between $F_{IF\ 1}$ and $F_{REF}$, this output being utilized to control the tuning of the VCO 26 to bring the two phase detector inputs into phase.

A quadrature phase detector 38 is coupled to the output of the band pass filter 30 via a 90° phase shift circuit 40, the $F_{REF}$ signal also being applied to this detector 38. This quadrature phase detector circuitry is incorporated to insure that the input phase lock loop locks up on the upper side of $F_x$ rather than on the lower side. A comparator circuit 24 is utilized for sensing the dc outputs from the two phase detectors 32 and 38 when the input phase lock loop is in lock. If the lock occurs with $NF_1$ 20 MHz below $F_x$, then the comparator 24 operates via switch 42 to open the input phase lock loop and reinstitute the search by the VCO 26 so that the lock will occur with $NF_1$ 20 MHz above $F_x$. This eliminates ambiguity problems in the transfer oscillator phase lock loop.

The output of the phase detector 32 is transmitted to the VCO 26 via a program attenuator circuit 44 having six selectable loop compensation circuits or lag networks which, by means of six switches, one for each search range or program step, are selected ove six lines from the step programmer 46 to give the proper loop compensation for that range of N numbers.

The output of this variable loop compensation circuit is transmitted via the lock mode switch circuit 42 to a suitable dc amplifier in the circuit 48 used to tune the VCO.

Figure 2:
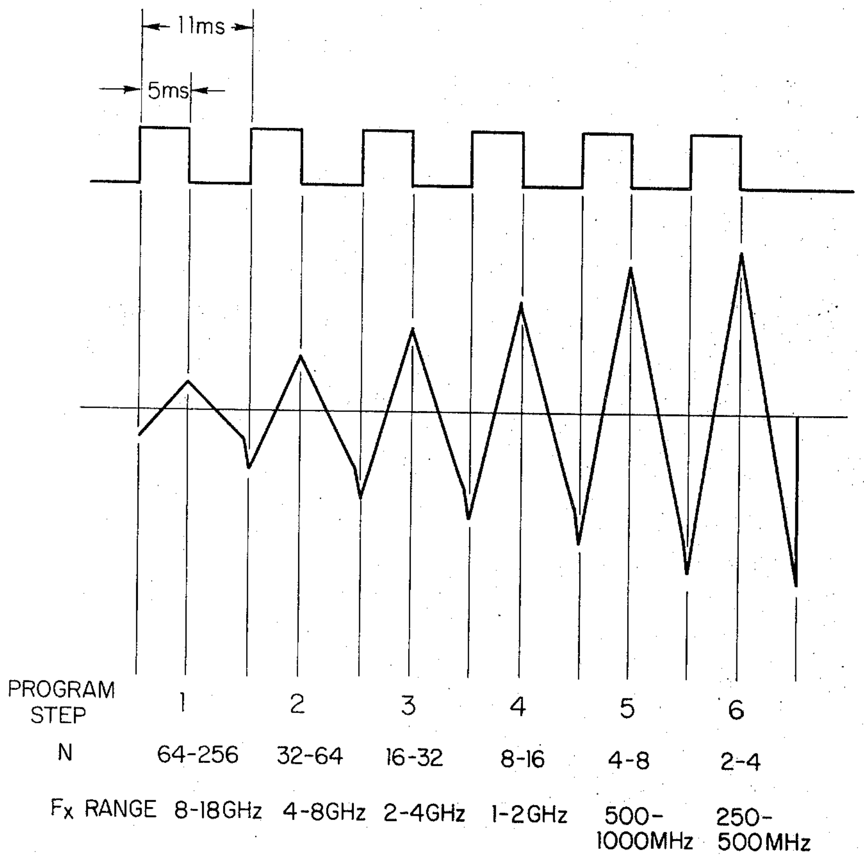
FIG. 2 are traces illustrating the operation of the search voltages.

In response to the initiation of a "search pulse" from the program control circuit 12, an operational amplifier circuit in the search generator 50 is turned on, this operational amplifier including an integrator network to produce a sawtooth output from the amplifier. Referring to FIG. 2, a 5 ms second one shot circuit energizes the amplifier for this 5 ms length of time, such that the output ramp or slope rises for 5 ms and thereafter decays, thus giving a sawtooth waveform. The programmer operates so as to deliver one of these sawtooth waveforms each 11 milliseconds. Thus for each of the six successive ranges, there is a single sawtooth waveform voltage generated to sweep the VCO 26 over a desired tuning range in search of lock. The six ranges are searched in order and, if no lock occurs, the search cycle is started over until the input phase lock loop reaches lock.

The output of the search generator 50 is supplied via switch 52 to the dc amplifier in circuit 48 at the input to the VCO 26. The signal input from the step programmer 46 that selected the proper loop compensation in circuit 44 also serves to selct one of six attenuator circuits in the dc amplifier in circuit 48 which serve to control the amplitude of the dc ramp signal fed from the dc amplifier in circuit 48 to the VCO 26. The rate of the voltage ramp for the low frequency search, i.e. 250–500 MHz, is very high and becomes successively lower for each of the increasing frequency range steps, the ramp rate being the lowest for the 8–18 GHz range. The high slope or rate for the low frequency range prevents lock up on a high harmonic number. Therefore, the probability of a particular frequency locking up in the correct N range is very much greater than the probability of locking up in a different range.

The VCO 26 is tuned in response to the output of the dc amplifier in circuit 48 to a frequency $F_1$ that brings the input phase lock loop to the locked condition $$F_x = NF_1 - F_{REF}$$

A transfer phase lock loop is provided to give a signal out, $F_2$, which is slightly offset by a small frequency, e.g., $F_o$ of 20 KHz, to give $F_2 = F_1 \pm F_o$. This circuit comprises a second VCO 60, mixer 38, band pass filter 62 and gate 64, dc amplifier and compensation circuit 66, and phase detector 68. The VCO 60 receives a feed forward voltage from the dc amplifier 48 to tune this VCO 60 to approximately the same frequency as $F_1$ of VCO 26.

The $F_2$ output passes through a buffer stage to the mixer 38 where it is mixed with $F_1$ to give an output to the band pass filter 62 which is tuned to about 20 KHz. With $F_2$ close to F ± 20 KHz as determined by a comparator in the BPF 62, the gate 64 is opened to transmit the offset reference frequency $F_o$ at 20 KHz to the phase detector 68 along with the frequency signal from the mixer 38. The phase detector 68 operates to deliver an error signal to the dc amplifier/compensation circuit 66 to tune the VCO 60 in a search for lock, where lock is $$F_2 = F_1 \pm F_o.$$

The dc amplifier/compensator 66 provides the compensation for the transfer loop gain and, in addition, processes the signal from the comparator 24 indicating the input loop is locked with the signal developed internally indicating the transfer loop is locked to give an output signal to the program control circuit 12 indicating both loops have reached lock. With both loops locked, the system can now proceed to determine if the input phase lock loop locked on a permissible N and also determine N to compute $F_x$.

The output $F_2$ of the transfer phase lock loop is transmitted via a sampler driver to the second sampler 18 where it is mixed with $F_x$ to give $$F_{IF\ 2} = N \cdot F_2 - F_x$$

which is transmitted via suitable amplifiers 70 and band pass filter 72 to a mixer circuit 74 where $F_{IF\ 2}$ is mixed with $F_{REF}$.

Since $$F_2 = F_1 \pm F_o$$

and since $$F_x = N\ F_1 - F_{REF}$$

then $$F_{IF\ 2} = N(F_1 \pm F_o) - (N \cdot F_1 - F_{REF}) = \pm NF_o + F_{REF}$$

Therefore, by mixing $F_{IF\ 2}$ with $F_{REF}$ (20 MHz) in mixer 74, the output is $NF_o$, or N 20 KH. This signal is sent to the time base circuit where a standard form of gate and counter circuit is operated for a period of time equalling 20 KHz permitting N pulses to be counted. The counter circuitry, by then multiplying the computed N by the known $F_1$, and by then subtracting the 20 MHz $F_{REF}$, obtains the frequency value of $F_x$ for display.

Since an N of 1 is not desired because it leaves a hole in the $F_x$ frequency spectrum, the counter circuitry will operate to reinitiate the search of the input loop locked on N = 1.

The time base circuit also receives the step number information from the program control circuit 12 so that it knows the permissible N numbers for this particular step. The computed N number is compared with this permissible N number range and, if within the range, $F_x$ will be displayed. If the computed N number is outside the range of permissible N numbers, a search pulse is generated to restart the input phase lock loop and search for a new lock.

Figure 3A:
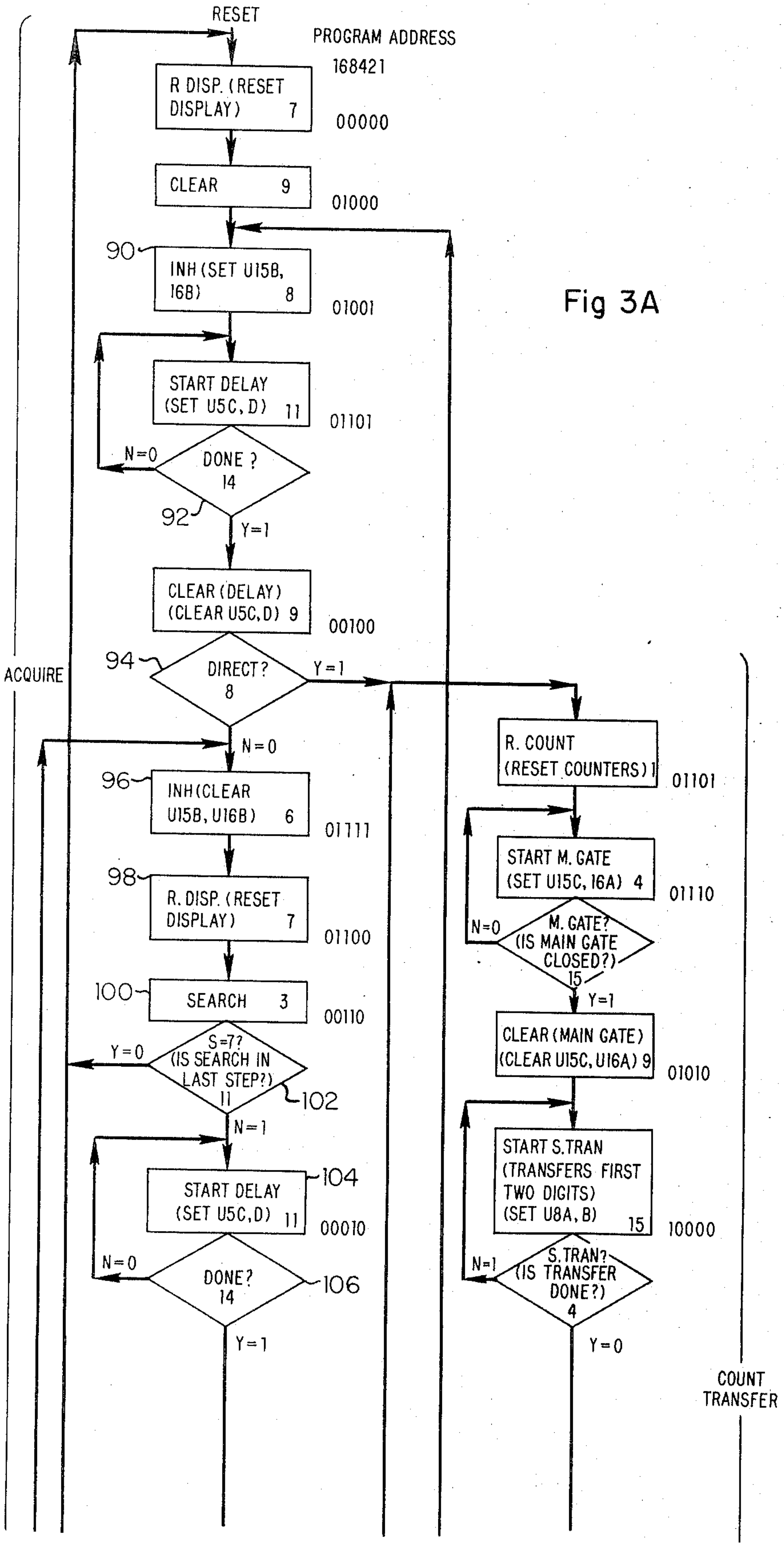
FIG. 3A–3B is a program flow chart.
Figure 3B:
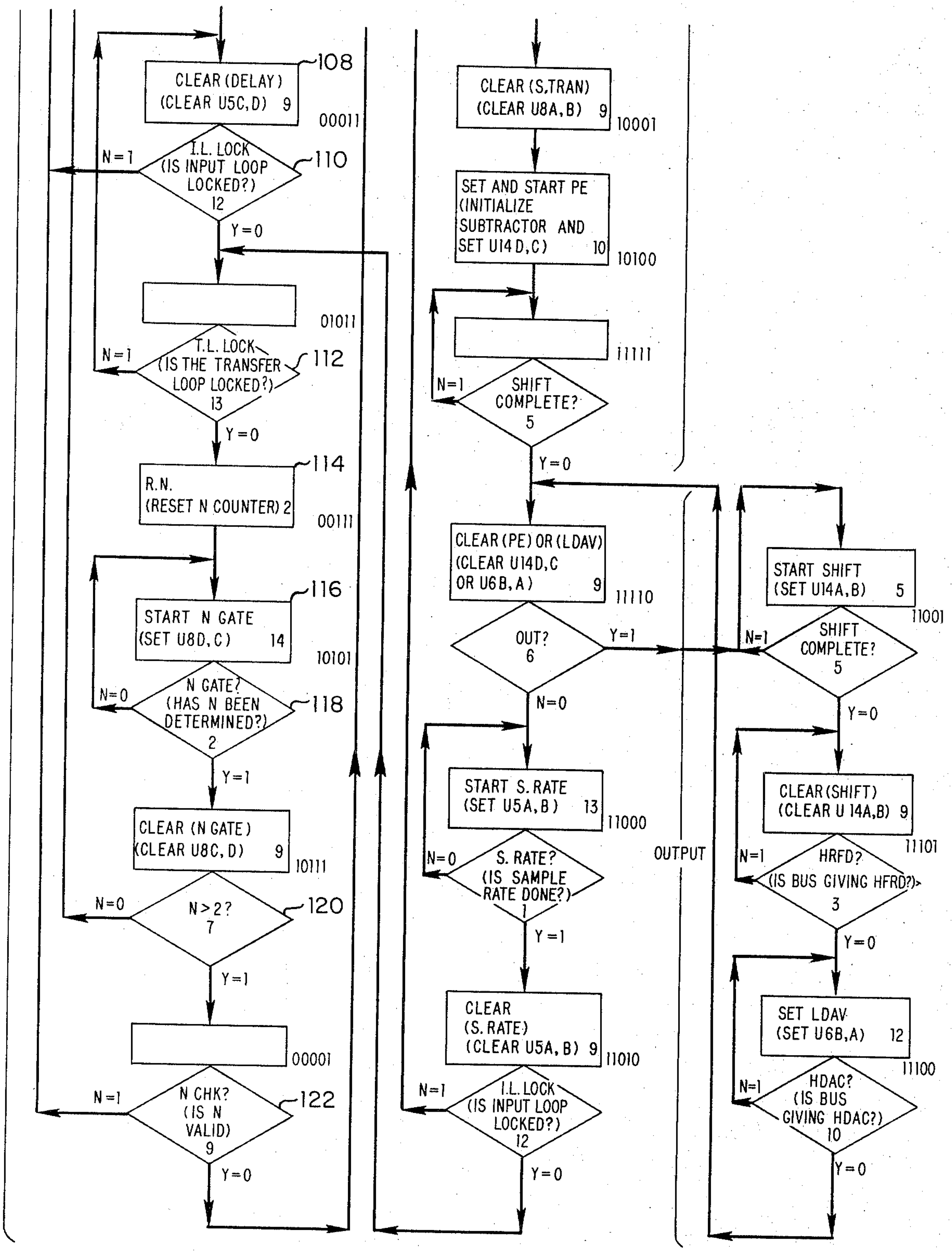

Referring now to the flow diagram of the programming of the present invention shown in FIG. 3, the program is initiated by resetting the displays, clearing the counters, etc. followed by the action step 90 to inhibit the input phase lock loop and the transfer phase lock loop during the direct count interval when the search for the low frequency input $F_x$ takes place. An 11 millisecond time delay is provided for this direct count period and a test 92 is made to determine if the delay period has taken place. If the test 92 indicates a false, then the 11 millisecond delay period is again instituted for a direct count period. If the delay period test 92 indicates a true, then the delay is cleared and the test 94 is made to determine whether or not a low frequency signal has been found. If the answer is true, then the process passes over into the count transfer series of operations where the low frequency is determined and displayed.

If the direct count test 94 is false, then the six step search through the higher frequencies is initiated. As a first action 96, the two phase lock loops are enabled, and the counters and displays are reset, 98, in case some count had been initiated therein, and the search pulse is initiated, 100. The system then operates as described above to proceed through the first one of the six steps to search for the lock of the input phase lock loop on an $F_x$ within that one N range. A test 102 is made to determine if the search being made is the step after the sixth program step and, if the answer is false, then the 11 millisecond delay period is started 104 during which the search in the one range or program step is conducted.

A test 106 is made to determine if the 11 second delay period has taken place and, if the answer is false, then the delay period is restarted so that the search in that step will in fact take place. If the answer is true, then the delay is cleared 108 and a test 110 is made to determine if the input phase lock loop has locked during that search step. If the answer is false then the phase lock loops are enabled 96, the displays reset 98, and the next search step initiated 100 to search the next N range. This cycle of search initiation, 11 millisecond delay, and test for input phase lock loop lock is continued cyclically through all six search steps until input phase lock loop is acquired on one of the six search steps or until the test 102 indicates that the system has initiated the seventh search step, at which time a true is produced which restarts the program from the very beginning with the direct count stage of operation.

This cycle of operation including the one direct count period followed by six search periods, followed by the repeating of the direct count period and the next six search periods, continues until a low frequency incoming signal has been detected during the direct count period or until the input phase lock loop has locked on an incoming signal during one of the six search periods.

When a true appears on the input phase lock loop test 110, a test 112 is then made to determine if the transfer phase lock loop has locked. If the answer is false, then the program operates to retest 108, 110 to see if the input phase lock loop is still locked and, if the answer is true, a second test 112 is made to determine if the transfer loop has locked. This sequence will continue as long as the input phase lock loop remains locked and until the transfer loop locks up.

With the transfer loop locked, a true appears to reset the counter 114 used to count the N pulses and then the main gate is opened 116 to permit calculation of N by the counter circuitry. A test 118 is then made to determine if the N pulses have been counted and, if not, the main gate is reactivated to insure determination of N. When N has been determined, a true occurs and at that time a test 120 is made to determine if N is equal to or greater than 2 since, as noted above, it is not desired that the system lock up on N = 1. If the answer is false, then the complete cycle of operation is reinitiated starting with the direct count period so that an N greater than 1 may be obtained in the locked condition.

If the number is equal to or greater than 2, a true activates a test 122 to determine if the N number computed is a proper N number. This is done as explained above by comparing the computed N number with the permissible range of N numbers for the particular program step at which the phase lock loop circuitry locks. If the N number check proves false, then the system does not return to the initial start but rather begins the search from the start of the six search ranges (action 96). The phase lock loop searching will then commence and continue until such time as the input phase lock loop locks on a permissible N number for the program step in which lock occurred. The true at this "N valid" test 122 initiates the count transfer stage of operation whereby the counter measures the $N F_1 - 20$ MHz as explained above by standard counter techniques to determine the exact value of the incoming $F_x$ and display this value.

Figure 4A:
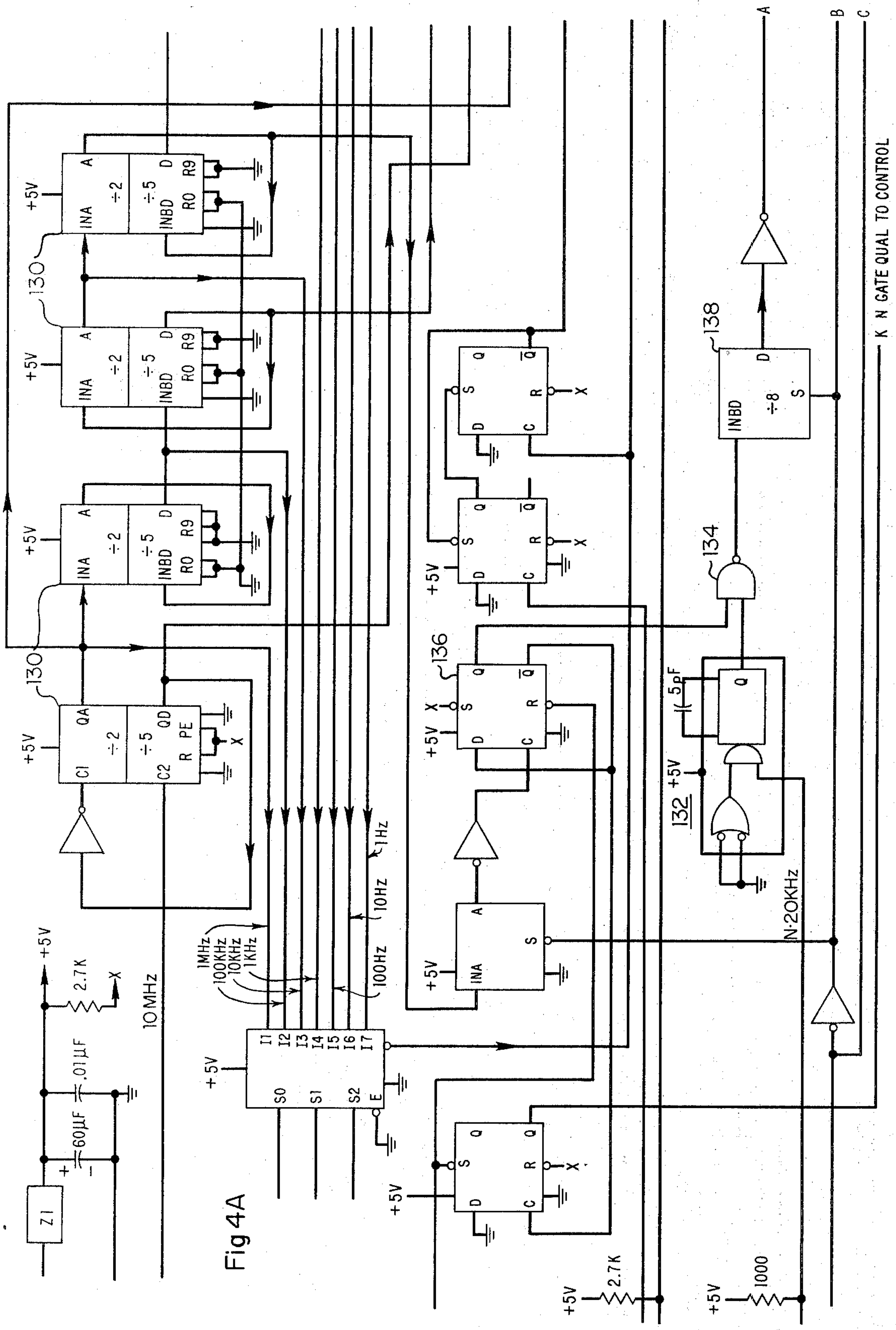
FIG. 4A–4C is a schematic diagram of the time base assembly utilized in the present invention.
Figure 4B:
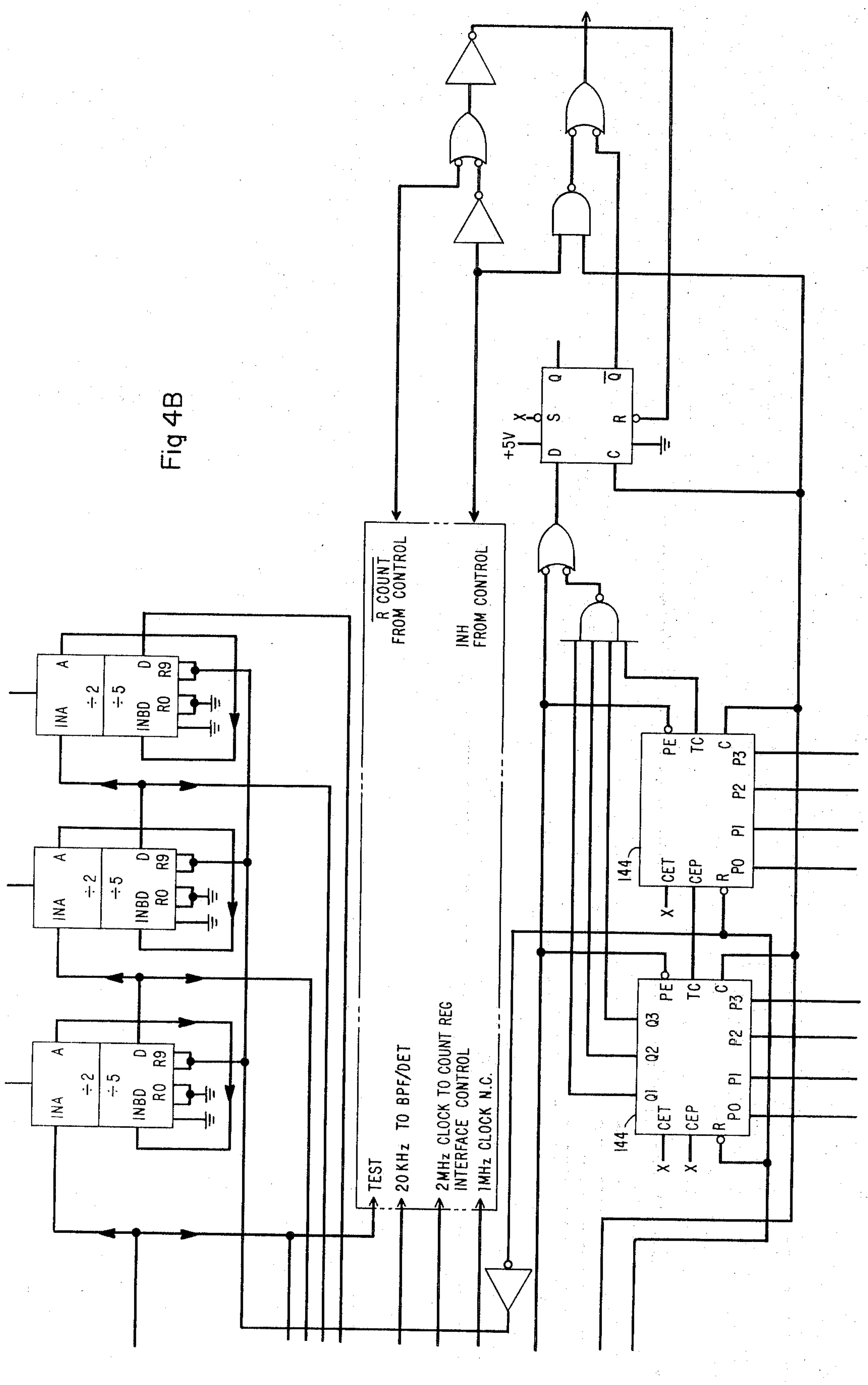
Figure 4C:
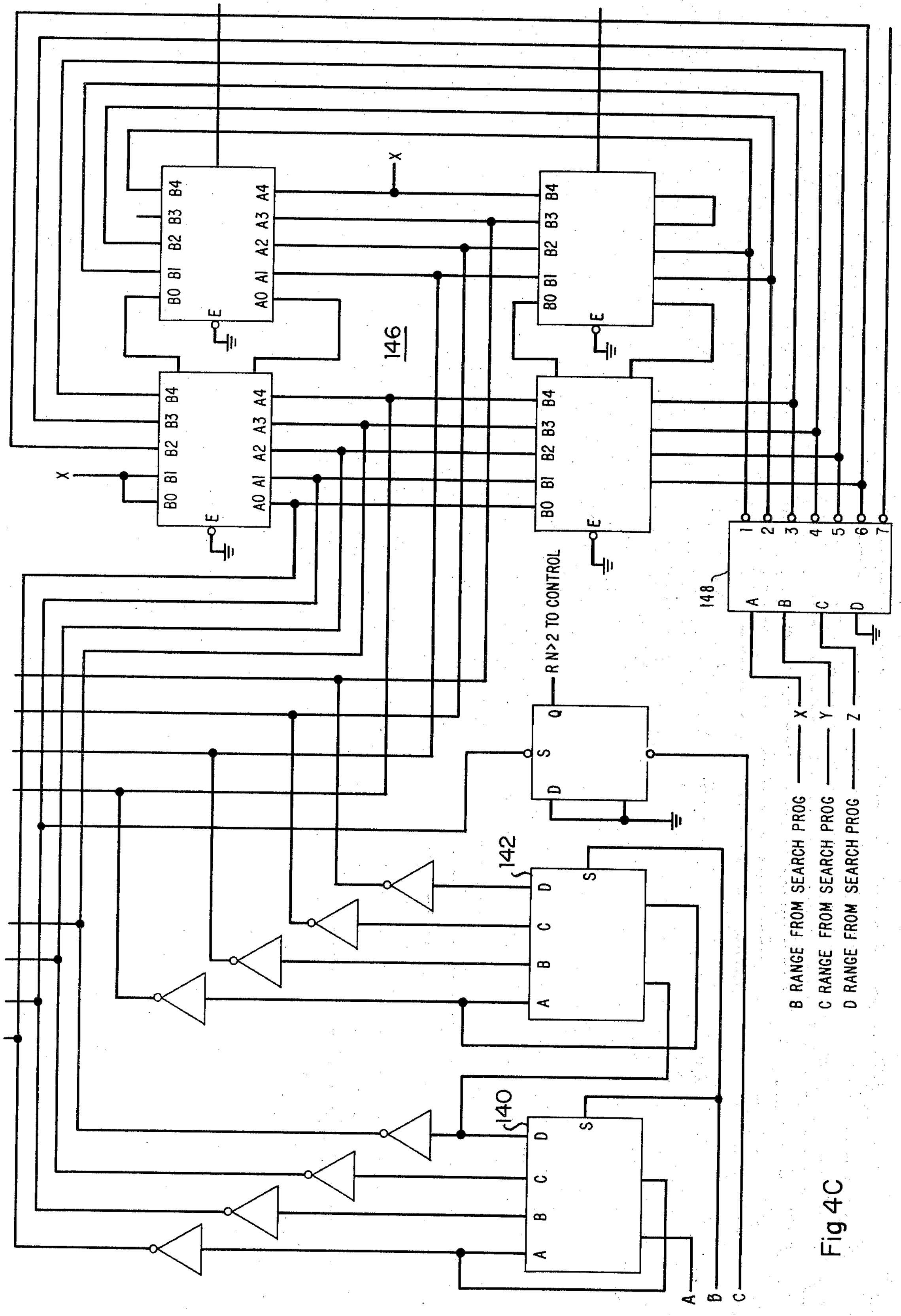

Referring now to FIG. 4 there is shown a schematic diagram of a form of time base assembly 51 utilized in the present invention which includes a plurality of divider circuits 130 (FIG. 3A) which operates upon an incoming main clock pulse of 10 MHz to produce the various lower frequency signals ranging from 1 MHz down to 1 Hz.

The N·20 KHz signal from the mixer 74 is transmitted through a pulse shaper circuit 132 to the "N" counter main gate 134 which is part of a frequency counter including the flip-flop 136, the divide by 8 circuit 138 and the two counters 140 and 142 (FIG. 3C). A 2.5 KHz clock signal controls the flip-flop 136 to operate the N counter main gate 134, the N·20 KHz pulses being delivered to the other input of the gate 134. The output of the gate 134 is N 8 pulses which are sent through the divide by 8 circuit to produce the desired N pulse output. This N pulse output is transmitted to the two counters 140, 142 which produce on their outputs the N count ranging from 1 through 128. This N count is sent through additional counters 144 (FIG. 4B) out to the high frequency counting circuitry where N is utilized to compute $F_x$ frequency for display in conventional manner.

The N count output of the two counters 140, 142 is also transmitted to the N checking circuit 146 which receives information from the programmer indicating which of the 6 steps the program has stopped in during this input phase lock loop locked state. This N checking circuit establishes an upper N number and a lower N number for the particular program step information received from the programmer via 148. So long as the N number received from the output of the two counters 140, 142 is within these upper and lower N number limits, a true output occurs to indicate that the phase lock loop has locked on a permissible N number. A false output will restart the search to seek lock on a permissible N number.

Figure 5A:
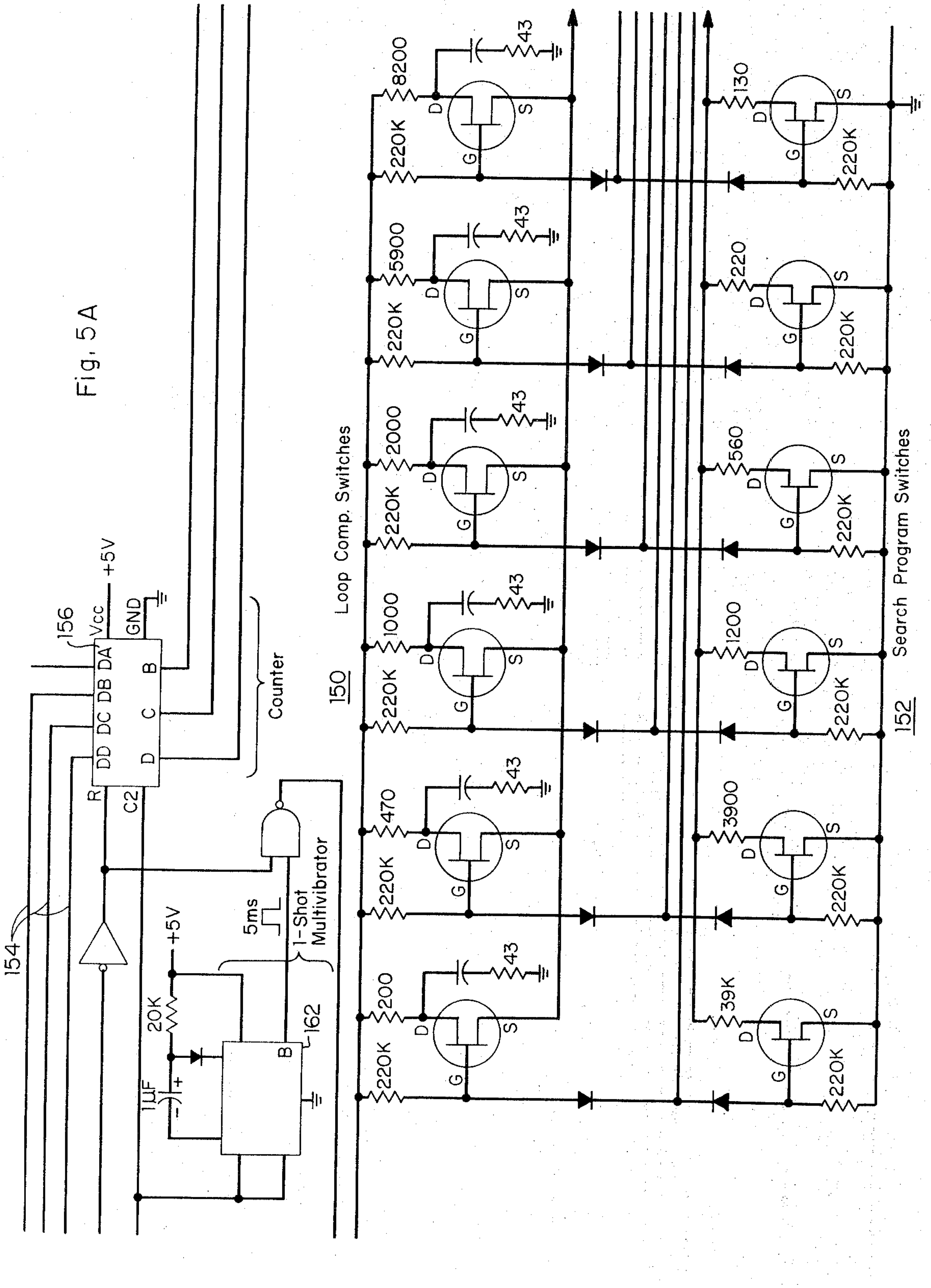
FIG. 5A–5B is a schematic diagram of the search programmer assembly of this invention.
Figure 5B:
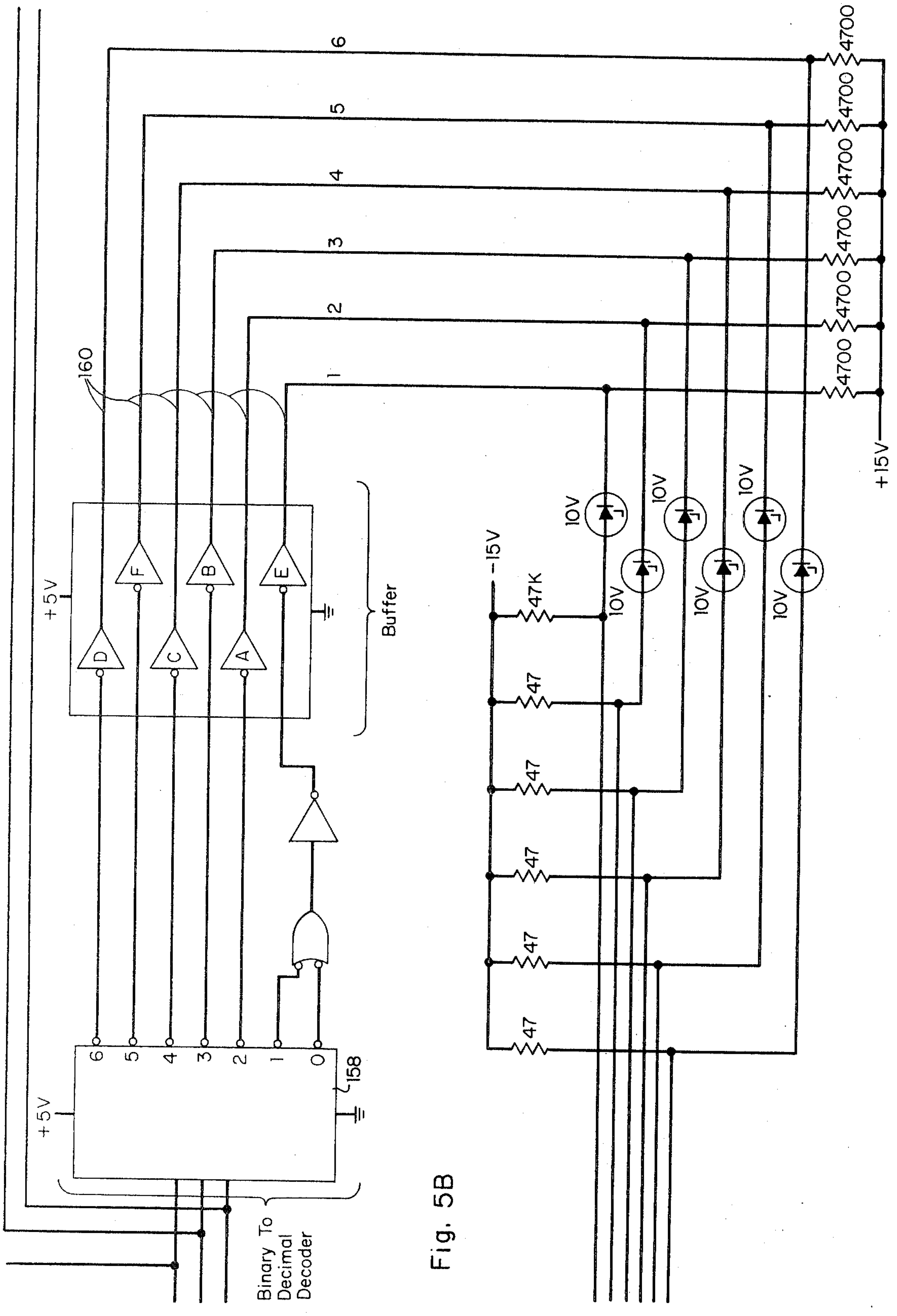

Referring now to FIG. 5, a preferred form of a step programmer 46 includes the loop compensation FET switches 150 (FIG. 5A) by which the six separate lag networks may be incorporated into the input phase lock loop for optimum operation. In addition, this circuit includes the six FET switches 152 which operate to provide the proper resistance values for the dc amplifier in the input phase lock loop to provide the proper slope or ramp for the output signal to tune the VCO 26 as described above. The information signifying which of the six program steps is being activated at any particular time is contained on the three input lines 154 to the counter circuit 156 which provides a binary output to the binary to decimal decoder 158 (FIG. 5B). The binary to decimal decoder 158 activates one of its six output lines in accordance with its particular program step indicated on the input, and these six outputs 160 serve to activate the associated one of the loop compensation switches 150 to switch the appropriate compensation network to the circuit of the input phase lock loop. In addition, these outputs also activate the associated FET switch 152 to insert the proper value of resistor into the dc amplifier circuitry of the input phase lock loop to determine the slope of the search voltage to the input VCO. The one shot multivibrator circuit 162 (FIG. 5A) serves to produce the 5 millisecond period during which the dc amplifier in the input phase lock loop circuit is activated to produce the rising portion of the sweep voltage to the oscillator. This multivibrator 162 is operated once every 11 milliseconds as determined by the programmer to produce the successive search periods during the program steps 1 through 6.

Figure 6:
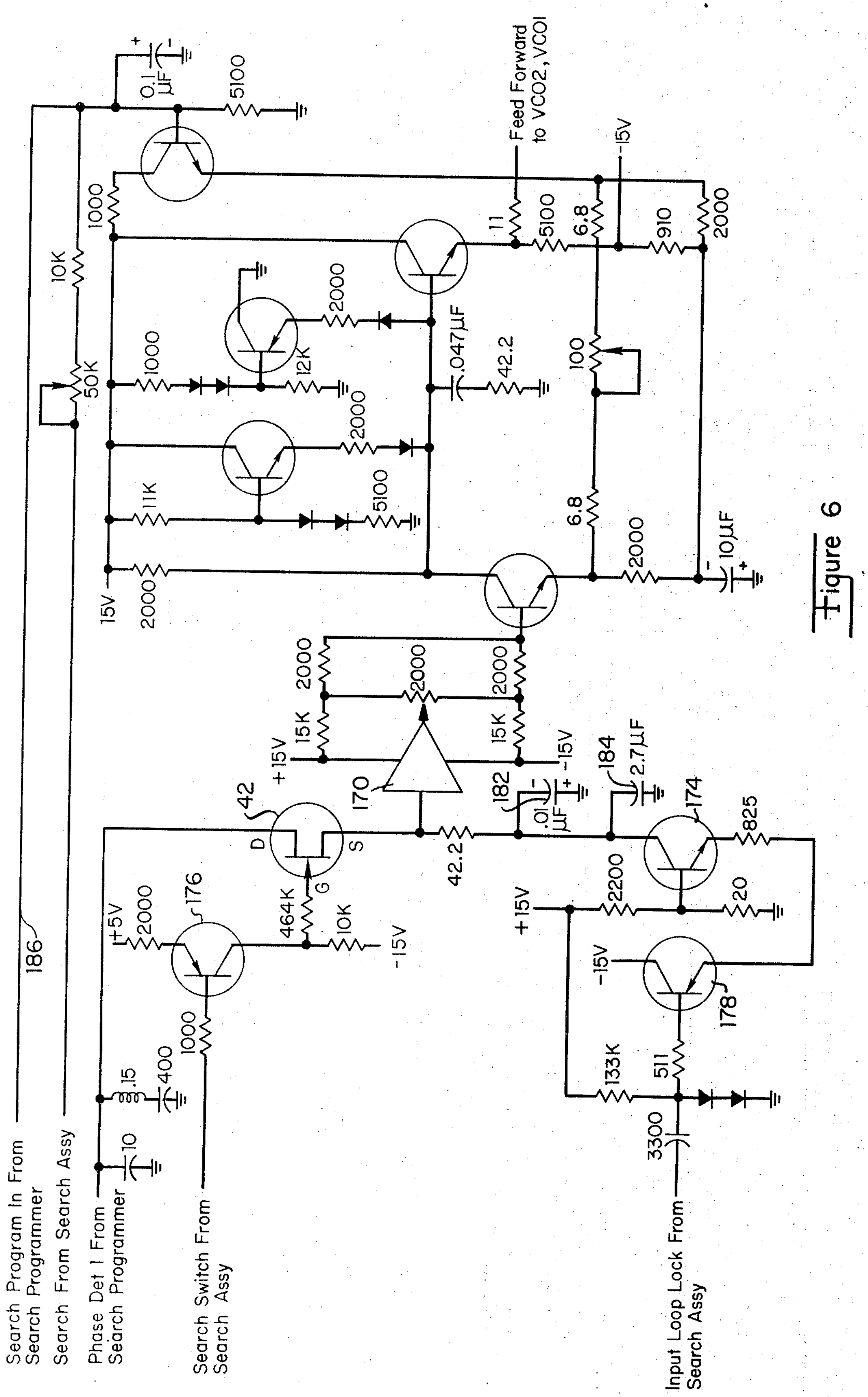
FIG. 6 is a schematic diagram of the amplifier/compensator assembly.

Referring now to FIG. 6 there is shown a schematic diagram of a preferred form of dc amplifier/compensator circuit 48 including a dc amplifier 170 and lock mode switches 42 and 174, and their drivers 176 and 178, respectively, coupled to the input of the amplifier. As described above, switch 42 operates to open the phase lock loop on incorrect phase lock (i.e., $NF_1 < F_x$). Switch 174 is actuated when phase lock has occurred but this phase lock condition is removed, as for example when the input $F_x$ is removed. This switches the dc voltage back to the quiescent search voltage condition by discharging capacitors 182 and 184. The selectable loop compensation networks on the search program assembly are coupled to the dc amplifier input via the FET switch 42 and these compensation circuits serve to provide the proper compensation for the input phase lock loop. The selectable resistors from the search program assembly which are utilized to determine the amplitude of the output voltage from the output amplifier of the circuit are coupled thereto via the input line 186.

Figure 7:
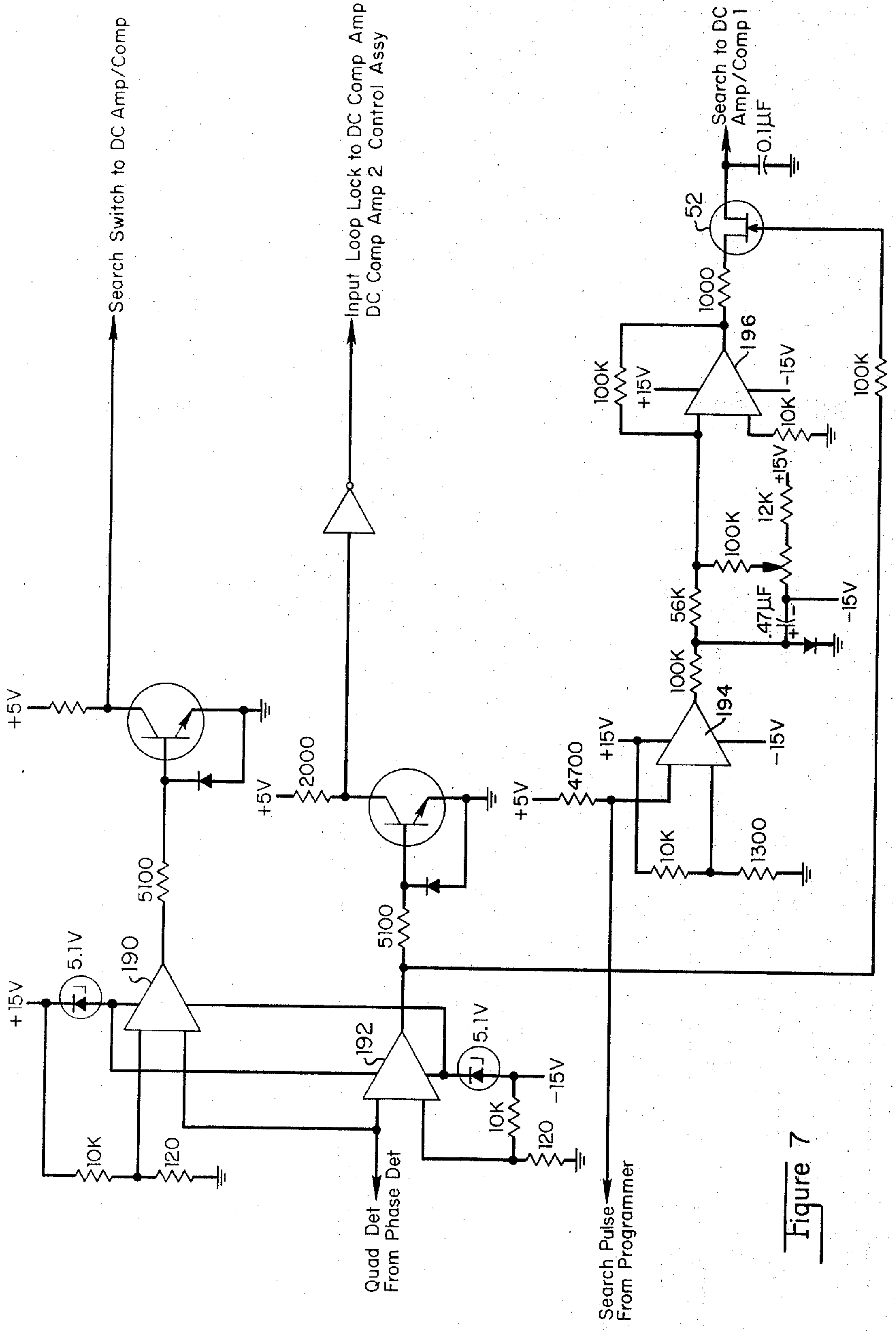
FIG. 7 is a schematic diagram of the search assembly section of this counter system.

In FIG. 7 there is shown a schematic diagram of a preferred form of search generator 50, including switch 52. When the quadrature detector 38 output goes negative, indicating $N F_1 > F_x$, comparators 190 and 192 are turned off, switching FET 52 off to stop the search. Likewise positive input from the quadrature phase detectors, indicating $NF_1 < F_x$, activates comparators 190 and 192, and FET switch 42 (FIG. 6) is opened, disabling phase lock. The two operational amplifiers 194 and 196 form the sawtooth generator 50.

What is claimed is:

1. A frequency counter for determining the frequency $F_X$ of an incoming signal comprising:

an input phase lock loop including a first tunable oscillator having an output signal comprising the harmonics of a frequency $F_1$, a sampler circuit coupled to the output of the first tunable oscillator and having an input for receiving the incoming signal, $F_X$, a phase detector coupled to the output of said sampler, a source of a reference signal having a frequency, $F_{REF}$, coupled to a second input to said phase detector, and a feedback circuit from said phase detector to said first tunable oscillator including a compensation network and a dc amplifier for providing a variable search voltage to said first tunable oscillator, said input phase lock loop locking on the incoming signal when $$F_X = N F_1 - F_{REF},$$

where N is an integer;

a transfer oscillator comprising a second tunable oscillator, a mixer coupled to the output of said second tunable oscillator and to the output of said first tunable oscillator, a band pass filter coupled to the output of said mixer, a second phase detector coupled to the output of said band pass filter, a source of an offset signal having a frequency $F_o$, and said offset signal source being coupled to said second phase detector, a compensation circuit coupled to the output of said second phase detector and to said band pass filter for providing an error signal to said second tunable oscillator to provide an output signal having a frequency $$F_2 = F_1 \pm F_o;$$

a second sampler circuit coupled to the output of said second tunable oscillator and receiving said incoming signal of frequency $F_X$ to produce an output signal having a frequency $$F_{IF\,2} = N \cdot F_2 - F_X;$$

a second mixer circuit coupled to said second sampler and to said source of reference signal having a frequency $F_{REF}$ for producing an output signal having a frequency $N \cdot F_o$;

means for determining N by dividing said second mixer output signal by said offset signal of frequency $F_o$; and means for calculating $F_X$ from the known values of $F_1$ and N.

2. A frequency counter as in claim 1 including a second phase detector in said input phase lock loop for preventing said loop from locking on the incoming signal when $$F_X = N\ F_1 + F_{REF}.$$

3. A frequency counter as in claim 1 including means for varying the compensation in the input phase lock loop feedback circuit in response to the value of N.

4. A frequency counter as in claim 1 including a search voltage source connected to said first tunable oscillator and means connected to the search voltage source for changing the amplitude of the search voltage to said first tunable oscillator as a function of the value of N.

5. A frequency counter as in claim 3 including a search voltage source connected to said first tunable oscillator and amplitude changing means connected to the search voltage source for changing the amplitude of the search voltage to said first tunable oscillator as a function of the value of N, there being a plurality of search voltage amplitude ranges and compensation ranges, each range corresponding to a range of N values.

6. A frequency counter as in claim 5 including stepping means connected to the means for varying the compensation and the amplitude changing means for stepping through each of the search voltage amplitude and compensation ranges in a predetermined order and means connected to the stepping means and the means for determining N for stopping the stepping in response to an indication that N is within the range of N values corresponding to the current step.

7. An apparatus for determining the frequency of an input signal comprising:

an input phase lock loop including a tunable oscillator and a loop compensation network for locking a harmonic of the tunable oscillator output signal to the input signal, within a predetermined offset;

circuit means connected to the input phase lock loop for determining the harmonic number of the tunable oscillator output signal harmonic to which the loop has locked; and compensation selection means responsive to the circuit means for varying the compensation supplied by the loop compensation network as a function of said harmonic number.

8. An apparatus as in claim 7 including a search signal generator for sweeping the tunable oscillator before lock is acquired, and means for varying the amplitude of the sweep as a function of said harmonic number.

* * * * *